United States Patent [19]

Miyake et al.

[11] Patent Number: 4,803,568
[45] Date of Patent: Feb. 7, 1989

[54] MOTOR CONTROL APPARATUS EFFECTING PHASE CONTROL ON ROTATING BODY

[75] Inventors: Izumi Miyake; Kiyotaka Kaneko; Kazuya Oda, all of Tokyo, Japan

[73] Assignee: Fuji Photo Film Co., Ltd., Kanagawa, Japan

[21] Appl. No.: 937,038

[22] Filed: Dec. 2, 1986

[30] Foreign Application Priority Data

Dec. 2, 1985 [JP] Japan .................. 60-269495

[51] Int. Cl.⁴ .................. H04N 5/781; G11B 19/20
[52] U.S. Cl. .................. 360/33.1; 318/314; 318/318; 360/73.03
[58] Field of Search .................. 360/73, 33.1, 35.1; 318/314, 318, 603; 369/239, 267, 50; 358/322, 335, 338, 342

[56] References Cited

U.S. PATENT DOCUMENTS 4,542,423 9/1985 Kotoke .................. 360/73
4,570,188 2/1986 Ichiyanogi .................. 360/73
4,647,828 3/1987 Wachi .................. 369/50

*Primary Examiner*—Alan Faber
*Attorney, Agent, or Firm*—Birch, Stewart, Kolasch & Birch

[57] ABSTRACT

A motor control apparatus includes a driving unit having a motor for rotating a body at a predetermined rotating speed; a reference position detecting unit for determining a reference position in a rotation of the body and for generating a phase signal representing the reference position; a phase controller for controlling the driving unit by use of the bias signal as a reference so that a generation of the phase signal causes the rotation of the body to be brought within a predetermined range with respect to a reference signal; and a bias control unit interconnected to the phase controller for determining a difference in phase of the phase signal from the reference signal to provide the phase controller with the bias signal according to the determined difference.

9 Claims, 3 Drawing Sheets

MOTOR CONTROL APPARATUS EFFECTING PHASE CONTROL ON ROTATING BODY

BACKGROUND OF THE INVENTION

1. Field of the Invention

The present invention relates to a motor control apparatus, and in particular, to a motor control apparatus suitable for a recording system for recording video signals on a rotary recording medium in an electronic still camera. An object is shot by use of an imaging device such as a solid-state imaging device to record the video signals produced by the imaging device on a rotary recording medium such as a magnetic disk. Also, the motor control apparatus can be used in a video signal recording system where video signals are read from a video memory and recorded on a rotary recording medium.

2. Description of the Prior Art

A conventional electronic still camera uses an imaging device such as a solid-state imaging device or an imaging tube in combination with a recording system using as a recording medium, a low-priced rotary recording medium such as a magnetic disk having a relatively large storage capacity, to shoot an object electronically as a still picture and to record the object on the rotating magnetic recording medium for reproducing the picture by using a separate television system or a printer.

In such a rotating recording medium, a favorable recording is only achieved when the rotating recording medium is in a predetermined stationary rotation. The conventional electronic still camera systems which have been put to the practical use include a still camera system constructed with a magnetic disk having a phase generator, PG, provided on a core of the magnetic disk so that a phase pulse is sensed in response to each rotation of the magnetic disk. The phase pulse is used for various control operations, for example, in a still camera system, the rotation servo of the magnetic disk, namely, the rotating speed and phase, are controlled by use of the phase pulse.

To reproduce a well-synchronized picture from the magnetic disk soon after the tracking operation of a magnetic disk in a playback system, it is advantageous that the initial position for recording the field of video signals on a track, namely, the position to record the vertical sync signal is within a predetermined range relative to the position where a PG signal is sensed. According to the standards of the ordinary recording format applied to the electronic still camera, the range is specified to be within 7H±2H of the position of PG generation, where H represents a period of time corresponding to one horizontal scanning line.

Consequently, in a case where video signals are supplied from a signal source, such as an imaging device, that has controllable timing for reading out, and the video signals are to be recorded on a magnetic disk at a preset timing, the recording timing of a field or frame of video signals can be controlled to include the vertical sync signal within the specified range relative to the position of the PG generation as described above.

In an electronic still camera, the first stroke of the shutter release operation enables a motor to start driving a magnetic disk and the PLL servo is accomplished in response to an FG signal followed by a PG signal, so that when the rotation of the motor reaches a predetermined rotating speed and phase with a predetermined tolerance range, video signals are read from the imaging device in synchronism with the PG signal to be recorded on the magnetic disk. However, contact of the sheet surfaces of the magnetic disk with the magnetic head and the regulating plate causes mechanical instability, and hence, the load applied to the driving motor is variable. As a result, even if such a PLL servo is set up, the system cannot rapidly respond to the variation in the load. Moreover, although the servo system is using automatic frequency control, AFC, and the automatic phase control, APC, as described above, it is sensitive to the influence from the environmental temperature of the system. It has also been required that the stationary rotation of the magnetic disk, obtained by applying the PLL servo under such a temperature change, be within the predetermined allowable range.

SUMMARY OF THE INVENTION

It is therefore an objective of the present invention to provide a motor control apparatus suitable for a recording system using a rotating recording medium to record video signals in which the video signals are recorded on each track of the rotating recording medium within a predetermined range of the phase error, thereby solving above-mentioned problems.

Accordingly the present invention is provided with a motor control apparatus comprising driving means including a motor for rotating a body at a predetermined rotating speed, reference position detecting means for determining a reference position in a rotation of the rotating body and to generate a phase signal representative of the reference position, phase control means for controlling said driving means by use of a bias signal at a reference so that a generation of the phase signal in the rotation of the rotating body is brought within a predetermined range with respect to a reference signal, and bias controlling means interconnected to said phase control means for determining a difference in phase of the phase signal from the reference signal to provide said phase control means with the bias signal according to the determined difference.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, a detailed description will be given of embodiments in which the motor control apparatus according to the present invention is applied to a recording device, such as an electronic still camera, using a rotating recording medium for recording video signals.

Figure 1:
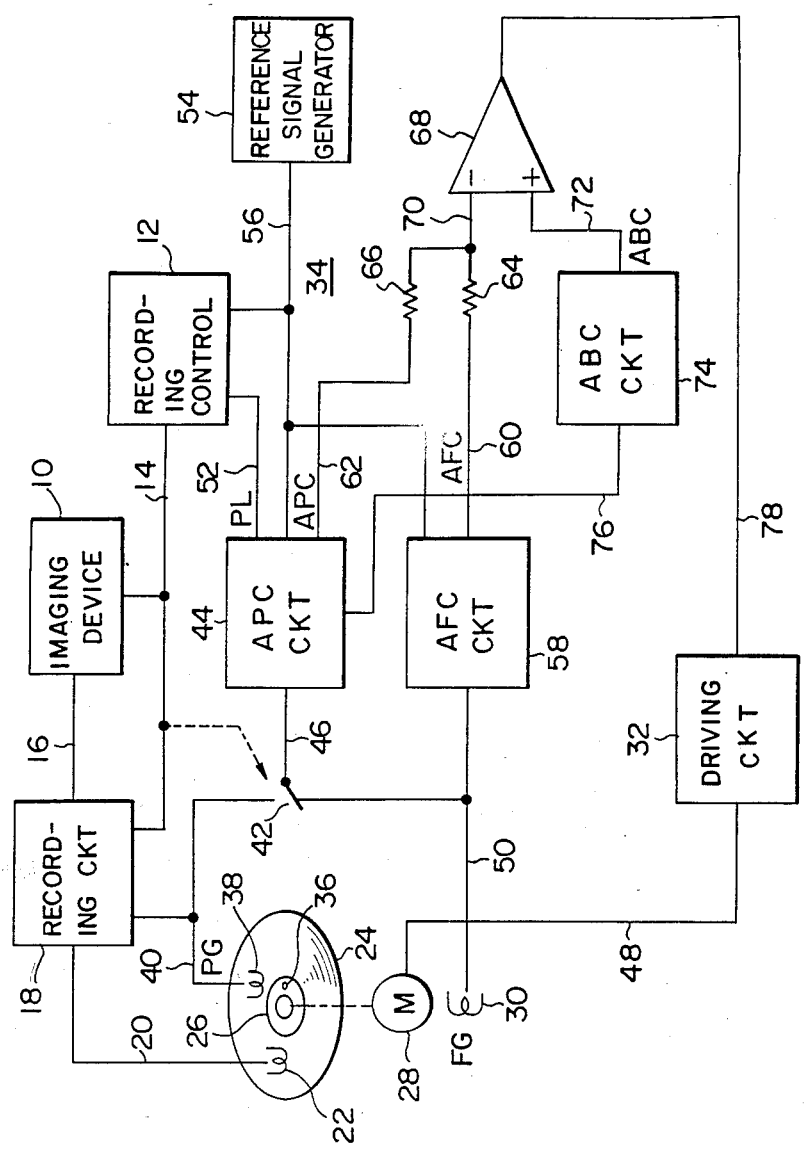
FIG. 1 is a schematic block diagram illustrating an embodiment in which the present invention is applied to an electronic still camera.

In FIG. 1, an embodiment in which the present invention is applied to an electronic still camera includes a solid-state image pickup device 10, such as a CCD, having a two-dimensional array of photosensitive cells on a focusing plane of an optical imaging system. The solid-state image pickup device 10 operates in response to a control signal that includes vertical and horizontal sync signals transmitted from a recording control 12 over a control line 14 so as to store video signals representative of the image of the object focused on the imaging plane, thereby producing the video signals in a serial format from its output 16.

The output 16 of the imaging device 10 is connected to a recording circuit 18, which is responsive to a control signal that includes vertical and horizontal sync signals, a record enable signal produced by the recording control circuit 12 on the control line 14 and a phase pulse PG, described later, to conduct a frequency modulation on the video signals transferred from the solid-state imaging device 10 according to a raster scanning fashion to produce the video signals that are modulated from output 20 in a predetermined format. The output 20 is connected to a magnetic recording head 22.

The magnetic recording head 22 is a magnetic transducing device mounted on a head transporting mechanism, not shown, and may be moved to a free track on a magnetic disk 24 under the control of the recording control 12 so as to record video signals on this track. The magnetic disk 24 has a core 26, which is detachably engaged with the top portion of a rotating shaft driven by a spindle motor 28 to rotate in a stable preset direction by using motor 28, a frequency generator, FG 30, a driving circuit 32, and a servo circuit 34.

The magnetic disk 24 may have 50 tracks recorded on a magnetic recording sheet having small diameter, for example, about 47 mm with a track pitch of about 100 $\mu$m, namely, the track width is about 50–60 $\mu$m with a guard band of about 50–40 $\mu$m. The motor 28 is rotated at a predetermined rotary speed, for example, 3,600 revolutions per minute (rpm), which enables video signals to be recorded at a field or frame rate.

The core 26 is provided with a phase generator 36 for generating a phase pulse PG with a predetermined reference rotating phase (angle) for each complete rotation of the disk 24. In the vicinity of the core 26, a sensor coil 38 is disposed to generate a phase pulse PG on a signal line 40 when the phase generator 36 passes the proximity of the coil 38. The signal line 40 is connected to the recording circuit 18 and, via a switch 42 for the servo circuit 34, to an input 46 of an automatic phase control, APC 44.

The servo circuit 34 is a motor control circuit for producing on a connecting line 48 a driving current to drive the motor 28 and includes a phase lock loop, PLL, for controlling the rotating speed and phase of the motor 28 on the basis of the frequency signal FG generated by the frequency generator 30 over a signal line 50 and the reference clock CLK generated by the reference generator 54.

In this embodiment, the frequency generator 30 is set such that the repetitive frequency of the signal FG is the inverse of an integral multiple of the frequency of the color subcarrier of video signals and is sufficiently higher than the frequency of the phase pulse PG, for example, by about 20 times as high as the latter.

The reference signal generator 54 includes a crystal oscillation device generating a clock pulse at a stable frequency in order to obtain a reference clock having a frequency of 14.3 MHz. This reference clock is further demultiplied to a frequency of 3.58 MHz associated with the color subcarrier. These clock signals CLK's are supplied from an output 56 of the reference generator 54 to the recording control 12, the automatic frequency control AFG 58, and a frequency divider 100 of the automatic phase control 44.

The servo circuit 34 has a lock detecting function, which measures the period or the frequency of the frequency signal FG based on the reference clock CLK to determine when the motor 28 is rotating at the predetermined rotating speed within the predetermined allowable range, namely, whether the lock state has been set up or not. If the rotating speed of the motor 28 is within the preset lock range, an output is set to its high level. This output 52 is delivered as a signal PL to the recording control 12. The predetermined lock range is advantageously set, for example, to a predetermined constant rotating speed of 3,600 rpm $\pm$ the period 2H.

The recording control 12 generates various periodic control signals, in response to the clock signal CLK received at the clock input 56, at the output 14. The control signals include a 15.7 kHz pixel clock for driving the photosensitive cells of the imaging device 10 to develop the stored charge, a horizontal sync signal, a sensor driving signal including a 60 Hz vertical sync signal, and a recording control signal for controlling the recording circuit 18.

In this embodiment, the recording control 12 controls the imaging device 10 and the recording circuit 18 so that a vertical sync signal is produced when a predetermined period of time, namely, 5H through 9H period, has lapsed since a phase pulse PG was generated and then a unit, for example, a field (1V), of video signals representative of a still picture, is recorded on a track of the disk 24 beginning from the position of the vertical sync signal.

The frequency generator 30 has an output 50 connected to the switch 42 and the automatic frequency control 58. The automatic frequency control senses the frequency signal FG from the frequency generator 30 to generate at an output 60 an automatic frequency control signal AFG which is used to synchronize the frequency signal FG representing the predetermined rotating speed with reference to the clock signal from the reference signal generator 54.

The automatic phase control 44 generates at an output 62 an automatic phase control signal APC so as to make the phase pulse PG operate within the predetermined period for the clock signal supplied from the reference signal generator 54. The output 62 of the automatic phase control 44 is also connected to the inverted input 70 of an operational amplifier via a resistor 66 and with the output 60, via a resistor 64, of the automatic frequency control 58. The operational amplifier 68 has the non-inverted input 72 connected to an output 72 from an automatic bias control ABC 74, which receives an output from the automatic phase control circuit 44 to develop an automatic bias control signal ABC.

The operational amplifier 68 has an output 78 connected to the driving circuit 32. As can be seen from this configuration, the operational amplifier 68 produces a sum, based on the automatic bias control signal ABC from the automatic bias control 74, the automatic phase control signal APC obtained via a resistor 66 from the output 62 of the automatic phase control 44, and the automatic frequency control signal AFC from the automatic frequency control 58, thereby producing at the output 78 a control signal associated with the sum of the above signals.

Figure 2:
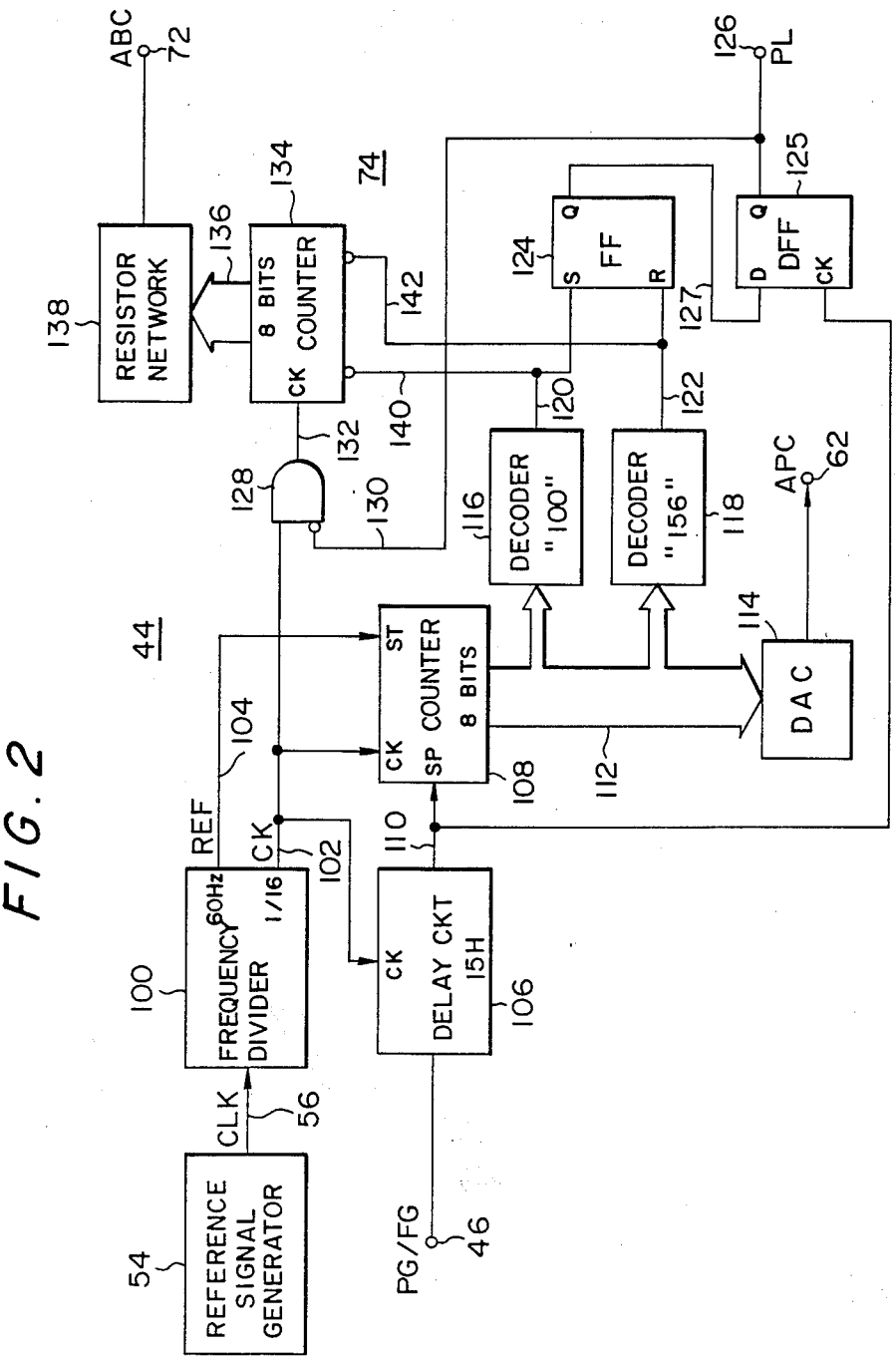
FIG. 2 is a block diagram depicting a configuration example of a phase servo circuit together with circuitry associated therewith of the embodiment shown in FIG. 1.

Referring now to FIG. 2, there is shown a detailed example of the automatic phase control 44, the automatic bias control 74, and circuits related thereto. The reference signal generator 54 has an output 56 connected to a demultiplier or frequency divider 100, which receives the clock CLK from the reference generator 54 to cause a 1/16 multiplication operation to produce a clock CK from an output 102. Moreover, the clock CK is further demultiplied or divided in frequency to obtain a reference signal REF having a frequency equal to the field frequency 60 Hz at an output 104. The clock CK is transmitted to a delay circuit 106 and a counter 108. The reference signal output 104 is connected to a count start input ST of the counter 108.

The delay circuit 106 is supplied with the phase pulse PG or the frequency signal FG on the signal line 46. When the phase pulse PG is applied to the input 46, the delay circuit causes a delay, 15H in this embodiment, to the phase pulse PG and then produces the delayed pulse at an output 110. In this embodiment, the delay circuit includes an 8-bit binary counter 108 for counting the clock CK supplied to the input 102. The output 110 of the delay circuit 106 is connected to a count stop input SP of the counter 108.

The counter 108 comprising the 8-bit binary counter initiates a count operation of the clock signal CK in response to the rising edge of the reference signal REF at the input ST and terminates the count operation in reply to the rising edge of the PG pulse obtained by delaying the input SP. As a consequence, a period of 15H is required for the counter 108 to reach its full count. An 8-bit output 112 of the counter 108 is connected to a digital-to-analog converter, DAC 114, which converts the input into an analog signal APC associated with a value of the 8-bit data. The analog signal APC transmitted at the output 62 and is used by the servo circuit 34 to achieve a phase control on the motor 28.

The 8-bit count value of the counter 108 is also connected to decoders 116 and 118. The decoder 116 is a decoding circuit which responds to the condition when the count value of the counter 108 is "100" in decimal notation to set its output 120 to its high level. The decoder 118 is also a decoding circuit which determines the condition when the count value of the counter 108 is "156" in decimal notation to set its output 122 to its high level. Since the count value "128" of the counter 108 represents that a period of 7H has lapsed since the generation of a phase pulse PG, the count values "100" and "156" represent that a period of 6H and a period of 8H has lapsed since the generation of a phase pulse PG, respectively.

These periods have an allowable range of period of ±1H centered about the point of time representing the delayed of 7H with respect to a generation of a phase pulse PG. Namely, according to the format standards for magnetic disks used in ordinary electronic still cameras, the record control 12 is reset at a point of time when a period of 7H elapses after a generation of a phase pulse PG in order for a magnetic disk 24 to stably rotate at a predetermined speed, whereby the allowable error range or tolerance range is set to ±1H. The decoders 118 and 116 are used to set the upper and lower limits of the allowable error range, respectively.

The output 120 from the decoder 116 is connected to the set input S of a flip-flop, FF 124, whereas the output 122 from the decoder 118 is linked to the reset input R. The flip-flop 124 has the Q output connected to the D input 127 of a D-type flip-flop, DFF 125, which has the clock input terminal CK linked to the output 110 of the delay circuit 106 and the output connected to an output terminal 126 and to the input of an AND gate 128 via an inverter.

As can be seen from this configuration, when the output 120 from the decoder 116 is set at its high level, namely, when the count value of the counter 108 exceeds "100" in decimal notation, the flip-flop 124 is set; whereas when the output 122 from the decoder 118 is set at its high level, namely, when the count value of the counter 108 exceeds "156" in decimal notation, the flip-flop 124 is reset. As a result, the Q output of the D-type flip-flop 125 is supplied with a phase lock detection signal PL indicating that the phase pulse PG is within the lock range or the phase lock state is established.

The other input of the AND gate 128 is supplied with the clock CK from the frequency divider 100. Consequently, when the output from the flip-flop 124 is at its low level, namely, when the phase lock state is not established, the clock CK is fed to an output 132 of the flip-flop 124.

The output 132 of the AND gate 128 is connected to the clock input CK of another 8-bit counter 134, which is a reversible counter having inputs 140 and 142, each receiving a signal indicating a counting direction, which are connected to the output 120 of the decoder 116 and the output 122 of the decoder 118, respectively, via an inverter. When the outputs 120 and 122 of the decoders 116 and 118 are both at the low level, the counter 134 causes an incrementing operation in response to the clock CK; whereas, when the outputs 120 and 122 are both at the high level, a decrementing operation is achieved. The counter 134 has an 8-bit parallel output 136 connected to a resistor network 138, which includes a ladder of resistors forming a digital-to-analog (D/A) converter circuit for delivering at the output 72 an analog voltage having a value associated with the input 136. The output is the automatic bias control signal ABC described above.

In operation, the counter 108 starts in response to the rising edge of the reference signal REF and stops the count operation in response to the rising edge of a phase pulse SP delayed by 15H. The count value 112 of the counter 108 is decoded by the decoders 116 and 118 and if the value 112 is beyond the range between "100" and "156" in decimal notation, namely, if the rotation of the magnetic disk 24 is not in its phase lock state, the flip-flop 124 is set. The clock CK supplied to the input 102 of the AND gate 128 is then gated to the counter 134, which operates in response to the clock CK.

If the count value of the counter 108 is in a range less than "100" in the decimal range, then the outputs 120 and 122 from the decoders 116 and 118, respectively, are both at the low level, and the counter 134 in turn accomplishes an advancing or incrementing operation in reply to the clock CK. In addition, if the count value of the counter 108 stays in a range between "100" and "156" in decimal notation, the AND gate 128 does not gate the clock CK to the clock terminal 132 of the counter 134, and hence, the counter 134 stops the count operation. If the count value of the counter 108 exceeds "156" in the decimal notation, the output 120 from the decoder 116 and the output 122 from the decoder 118 are set to the high level causing the counter 134 to perform a decrementing operation in response to the clock CK.

Namely, if the rising edge of the reference signal REF does not appear within a period of 7H±1H from when the sensing coil 38 produces a phase pulse PG from the magnetic disk 24, the counter 134 starts the count operation. If the time difference between the detection of the phase pulse PG and the positive-going edge of the reference signal REF is equal to or less than 6H, the counter 134 causes the incrementing operation; whereas if the time difference is equal to or more than 8H, the decrementing operation is caused. The count value of the counter 134 is converted into an analog voltage by the resistor network 138, and the analog voltage is in turn transmitted as the automatic bias control signal ABC to the terminal 72. Consequently, the automatic bias control signal ABC has a voltage associated with an offset of the rotation of the magnetic disk 24 with respect to the phase lock range 7H±1H.

Such an automatic bias control signal ABC is supplied as a bias signal to the operational amplifier 68 so as to be used to cause an automatic adjustment to the phase lock point in the operational amplifier 68.

Figure 3:
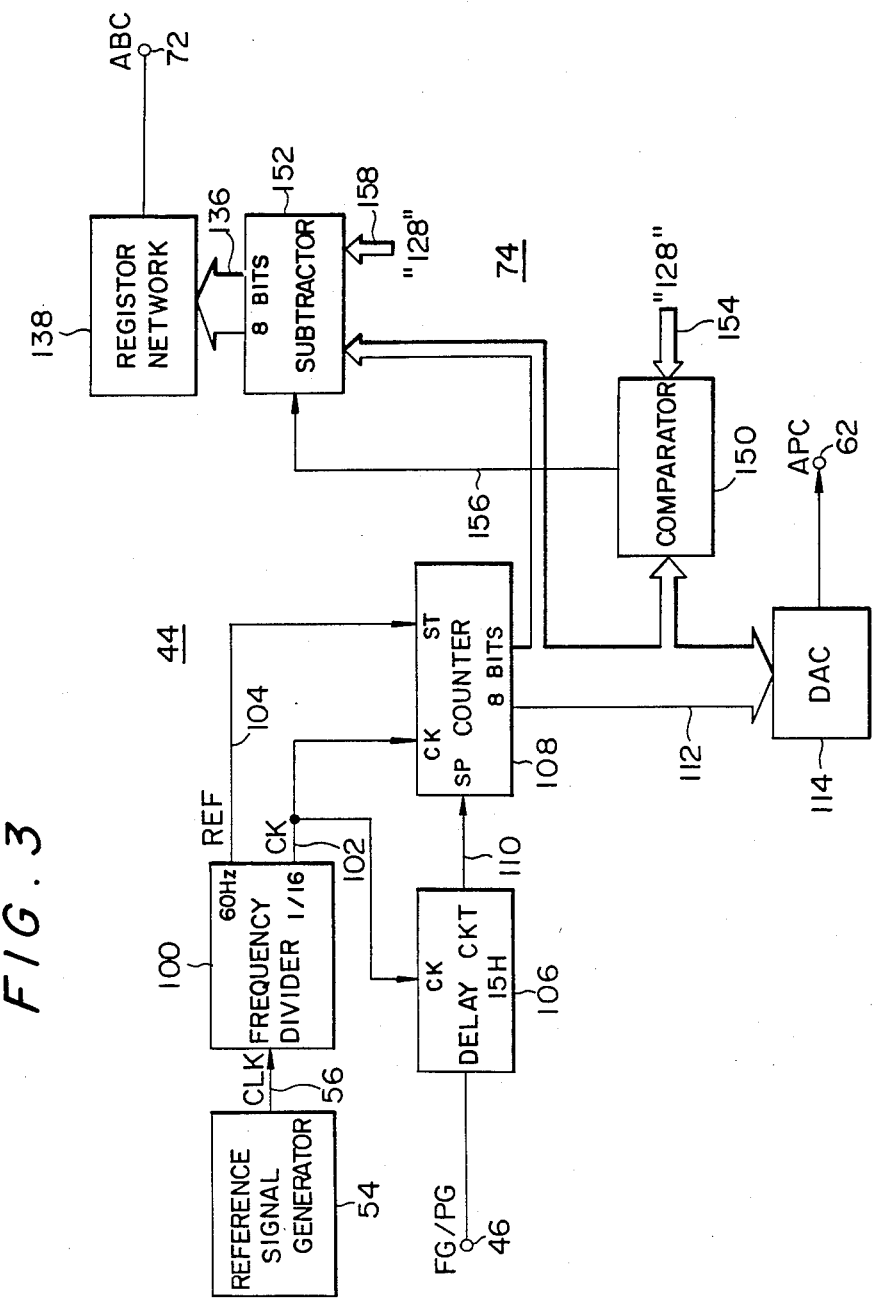
FIG. 3 is a block diagram, similar to FIG. 2, showing another configuration example.

Referring now to FIG. 3, there is shown another embodiment of the automatic bias control 74. In this configuration, the components like those of FIG. 1 are denoted with the same reference numerals, respectively, and hence, the further description of these components will be omitted. In this embodiment, in place of the decoders 116 and 118, the flip-flop 124, the AND gate 128 and the reversible counter 134 of the embodiment of FIG. 2, a comparator 150 and a subtractor 152 are used.

The comparator 150 has an input to which the 8-bit count value 112 from the counter 108 is supplied and another input 154 to which a decimal, fixed value "128", namely, a binary notation of eight bits "10000000" is supplied, thereby comparing these input values. An output representing the result of the comparison is connected to the subtraction control input of the subtractor 152.

The subtractor 152 is an 8-bit subtraction circuit which has one input for receiving the 8-bit parallel output 112 from the counter 108 and the other input 158 for receiving a fixed value "128", thereby effecting a subtraction on the input values. The sequence of the values in the subtraction operation, namely, whether the input 158 is subtracted from the input 112 or the input 112 is subtracted from the input 158, is specified by a control input 156. The 8-bit parallel output 136 from the subtractor 152 is connected to the resistor network 138.

The count value 112 from the counter 108 is compared with the fixed value "128" in the comparator 150. The fixed value "128" is associated with the period 7H between the reference signal REF and the phase pulse PG. Alternatively, without setting a single, fixed value as described above, two sets of comparators 150 and subtractors 152 may be disposed to set two fixed values "100" and "156" for specifying the upper and lower limits of the phase lock range.

When the count value 112 from the counter 108 is at most equal to the fixed value "128", the comparator 150 produces from the output 156 a signal indicating that the fixed value is to be subtracted from the count value 112 in the subtractor 152. Similarly, if the count value 112 from the counter 108 is more than the fixed value "128", the comparator 150 develops from the output 156 a signal indicating that the count value 112 is to be subtracted from the fixed value in the subtractor 152.

According to the control input 156, the subtractor 152 causes a subtraction operation between the count value of the counter 108 and the fixed value "128" to produce at the output 136 an 8-bit data associated with the result of the subtraction. Consequently, from the output 72 via the resistor network 138, is an automatic bias control signal ABC is developed associated with the subtraction result from the subtractor 152.

As can be seen from the description above, the automatic bias control signal ABC of this embodiment adjusts the bias on the operational amplifier 68 according to an offset of the phase of the magnetic disk 24 with respect to the reference established by the predetermined period of 7H from the reference signal REF.

In these embodiments, to maintain the speed control of the motor 28, a lock range of 7H±1H is set with respect to the phase pulse PG so that the bias on the phase servo circuit 34 is adjusted according to the delay or advance of the angular phase of the magnetic disk 24 with respect to the reference signal in the lock state. The bias adjustment is implemented by use of a simple configuration including a reversible counter or a subtractor. Consequently, the variation in the load of the driving motor 28 and the change in operation of the servo circuit 34 dependent upon temperature can be satisfactorily respond to by accomplishing an appropriate bias adjustment.

The embodiments has been described for the explanation of the present invention; however, the present invention is not restricted to these embodiments. Modification and change of the embodiments by those skilled in the art without departing from the spirit of the invention are included in the scope of the present invention. For example, although the present invention has been applied to the electronic still camera in the embodiments, the present invention can also be applicable to a recording system in which the video signal data is stored, for example, in a video memory and read from the memory to be recorded in a rotary recording medium such as a magnetic disk or an optical disk. The present invention can also be applicable to a motor control apparatus having an ordinary phase synchronization or lock loop.

As described above, according to the present invention, to achieve the speed control of a driving motor for driving a rotating recording medium, a predetermined lock range is set for the phase pulse, and in the lock state, the bias for the phase servo system is adjusted according to the delay or advance of the phase of the rotating recording medium with respect to the reference signal. Consequently, the change in the load of the driving motor and the variation in the operation of the servo circuit dependent upon temperature can be satisfactorily respond to by appropriately adjusting the bias.

As a consequence, a recording system for recording video signals on a rotating recording, according to which the motor control apparatus of the present invention is applied, can be implemented with a simple configuration and is enables the recording of video signals on the tracks of the rotating recording medium within the predetermined phase error range.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A motor control apparatus comprising:
   drive means including a motor for rotating a body at a predetermined rotating speed and phase;
   reference position detecting means for determining a reference position in the rotation of the body and generating a phase signal representative of the reference position;
   phase control means, responsive to said reference position detecting means, for controlling said drive means by use of a bias signal, said bias signal representing an offset of the phase of the rotating body;
   said phase control means causing the rotation of the body to be brought within a predetermined range with respect to a reference signal, said reference signal representing said predetermined rotating speed; and
   bias control means, operatively connected to said phase control means, for determining a difference between said phase signal and said reference signal and for providing said drive means with said bias signal according to the determined difference;
   said phase control means including first counter means for counting a period within the predetermined range;
   said bias control means including second counter means, responsive to said first counter means, for incrementing a control count when a count contained in said first counter means is below a lower limit of the predetermined range and for a decrementing said control count when the count exceeds an upper limit of the predetermined range, said control count representing a value of said bias signal, thereby generating said bias signal according to the value of said control count of said second counter means.

2. The motor control apparatus according to claim 1, wherein said body comprises a magnetic disk on which video signals are recorded, said motor control apparatus further comprising recording means, responsive to said reference position detecting means, for receiving a video signal and recording the video signal on the magnetic disk with reference to the reference position thus determined.

3. The motor control apparatus according to claim 2, further comprising image sensor means, operatively connected to said recording means, for sensing an optical image formed on said image sensor means and producing the video signal representative of the sensed image for said recording means.

4. The motor control apparatus according to claim 1, further comprising:
   frequency control means, responsive to said drive means, for sensing the rotating speed of the motor and producing a frequency control signal;
   said phase control means including,
   automatic phase control means, responsive to said reference position detecting means, for producing an automatic phase control signal, and
   adder means, operatively connected to said automatic phase control means, said frequency control means, and said bias control means, for adding said automatic phase control signal to said frequency control signal and said bias signal to produce a control signal used for controlling said drive means.

5. The motor control apparatus according to claim 1, wherein said bias control means further includes decoder mean, operatively connected to said first counter means, having values representative of said upper and lower limits defining said predetermined range, for determining when a count of said first counter means reaches either of said values representative of said upper and lower limits and enabling said second counter means to perform either said incrementing or decrementing operations accordingly.

6. The motor control apparatus according to claim 1, wherein said bias control means further includes:
   first decoder means, operatively connected to said first counter means, for determining when said first counter means contains a count associated with the lower limit of the predetermined range; and
   second decoder means, operatively connected to said first counter means, for determining when said first counter means contains a count associated with the upper limit of the predetermined range;
   said second counter means, in response to said first and second decoder means, incrementing when said first and second decoder means determine that said count of said first counter means does not exceed values associated with said lower and upper limits and decrementing when said first and second decoder means determine that said count of said first counter means exceeds the values associated with said lower and upper limits.

7. A motor control apparatus comprising:
   drive means including a motor for rotating a body at a predetermined angular speed and phase;
   reference position detecting means for determining a reference position in the rotation of the body and generating a phase signal representative of the referenced position;
   phase control means, responsive to said reference position detecting means, for controlling said drive means by use of a bias signal, said bias signal representing an offset of the phase of the rotating;
   said phase control means causing the rotation of the body to be brought within a predetermined range with respect to a reference signal, said reference signal representing said predetermined angular speed; and
   bias control means, operatively connected to said phase control means, for determining a difference between of the phase signal and the reference signal and providing said phase control means with said bias signal according to the determined difference;
   said phase control means including first counter means for counting a period within the predetermined range;
   said bias control means including subtractor means, responsive to said first counter means, for enabling a subtraction between a count contained in said first counter means and a value defining said predetermined range, thereby generating said bias signal according to a result of the subtraction in said subtractor means.

8. The motor control apparatus according to claim 7, wherein said bias control means further includes comparator means, operatively connected to said first counter means, for comparing a count contained in said first counter means with said value defining said predetermined range and providing said subtractor means with a signal instructing a direction of subtraction between said count of said first counter means and said value defining said predetermined range.

9. The motor control apparatus according to claim 7, wherein said body comprises a magnetic disk on which video signals are recorded, said apparatus further comprising recording means, responsive to said reference position detecting means, for receiving a video signal, said video signal is recorded on the magnetic disk with reference to the reference position thus determined.

* * * * *